Figure 1:
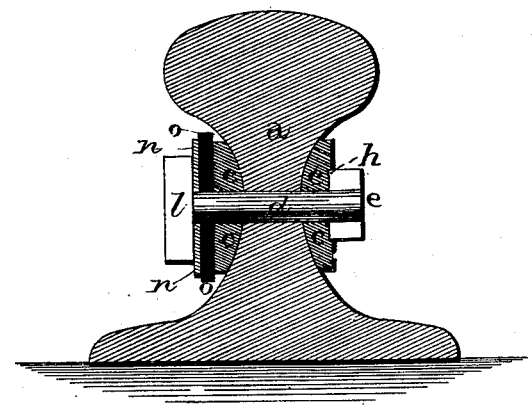
Figure 2:
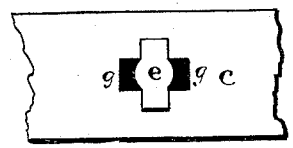
Figure 3:
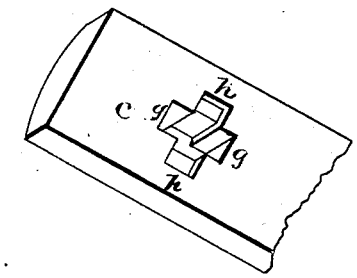
Figure 4:
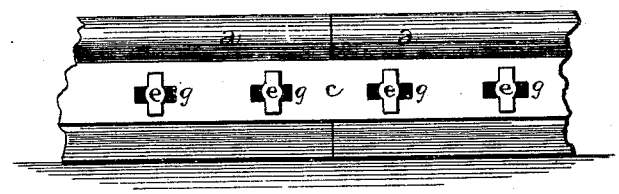

S. W. GRIFFITH.
Railroad-Rail Joint.

No. 168,480.

Patented Oct. 5, 1875.

WITNESSES.

INVENTOR.
S. W. Griffith
per
F. A. Lehmann, Atty

UNITED STATES PATENT OFFICE.

SHIPMAN W. GRIFFITH, OF UNION CITY, PENNSYLVANIA.

IMPROVEMENT IN RAILROAD-RAIL JOINTS.

Specification forming part of Letters Patent No. 168,480, dated October 5, 1875; application filed August 24, 1875.

*To all whom it may concern:*

Be it known that I, SHIPMAN W. GRIFFITH, of Union City, in the county of Erie and State of Pennsylvania, have invented certain new and useful Improvements in Coupling for Railroad-Rails; and I do hereby declare the following to be a full, clear, and exact description of the invention, such as will enable others skilled in the art to which it pertains to make and use it, reference being had to the accompanying drawings, which form part of this specification.

My invention relates to an improvement in couplings for railroad-rails; and it consists in the arrangement and combination of parts that will be more fully described hereinafter, whereby the bolts are locked in position in such a manner that they can only be loosened by intention, and the use of nuts entirely dispensed with.

The accompanying drawings represent my invention.

$a\ a$ represent the ends of two rails, secured together by the fish-plates $c$ and bolts $d$. Instead of the ends of the bolts being round, and having screw-threads cut in them to receive nuts, in the usual manner, they are made nearly flat, and have the T-shaped heads $e$ formed on them. The holes for the bolts through the fish-plates are made elongated, instead of round, to correspond to the shape of the heads of the bolts, and half-way between, or directly at right angles to the holes $g$, are made the recesses $h$, which are just large enough to receive the ends of the heads $e$. Against the plate, on the side of the square heads $l$ of the bolts, is placed a suitable rubber or other spring, $o$, through which the bolt passes, and on top of this spring is placed a washer, $n$, large enough to protect the spring from friction as the bolt is being turned. The bolt is passed through the washer and spring, and is then inserted into the rail. While the spring is uncompressed the bolt is not sufficiently long to have its head come entirely through both plates and the rail; but by bearing in upon the bolt, and thus compressing the spring, the head will be forced through, when it is then turned at right angles until it snaps into the recesses $h$.

By means of this fastening the use of nuts is entirely dispensed with, the bolts cannot work loose, and yet they can be removed and replaced at will.

Having thus described my invention, I claim—

1. The combination of the bolt $d$, having the heads $e\ l$, with a fish-plate, having the notches or recesses $h$, substantially as set forth.

2. The combination of the bolt $d$, having the heads $e\ l$, spring $o$, fish-plates $c$, having the holes $g$, and recesses $h$ and rails $a$, substantially as specified.

In testimony that I claim the foregoing I have hereunto set my hand this 14th day of August, 1875.

SHIPMAN W. GRIFFITH.

Witnesses:
DANIEL O. CARLE,
F. E. STAPLES.